United States Patent
Logan

(10) Patent No.: US 6,214,607 B1
(45) Date of Patent: Apr. 10, 2001

(54) METHOD AND APPARATUS FOR TREATING PERCHLORATE-CONTAMINATED DRINKING WATER

(75) Inventor: Bruce E. Logan, State College, PA (US)

(73) Assignee: The Penn State Research Foundation, University Park, PA (US)

(*) Notice: Subject to any disclaimer, the term of this patent is extended or adjusted under 35 U.S.C. 154(b) by 0 days.

(21) Appl. No.: 09/282,261

(22) Filed: Mar. 31, 1999

Related U.S. Application Data

(60) Provisional application No. 60/080,622, filed on Apr. 3, 1998.

(51) Int. Cl.[7] .................................................. C02F 3/34
(52) U.S. Cl. .................. 435/262.5; 435/264; 435/299.1; 210/605; 210/611
(58) Field of Search .................................... 435/262, 262.5, 435/266, 289.1, 299.1, 264, 296.1; 210/150, 151, 605, 610, 615–619, 630, 611

(56) References Cited

U.S. PATENT DOCUMENTS

| | | | |
|---|---|---|---|
| 3,640,821 | 2/1972 | Sweeny et al. | 210/59 |
| 3,943,055 | * 3/1976 | Korenkov et al. | 210/2 |
| 5,266,213 | 11/1993 | Gillham | 210/747 |
| 5,302,285 | * 4/1994 | Attaway et al. | |
| 5,837,145 | 11/1998 | Dzombak | 210/715 |

FOREIGN PATENT DOCUMENTS

97/17301 * 5/1997 (WO).

OTHER PUBLICATIONS

United States Environmental Protection Agency, Office of Ground Water And Drinking Water, "Perchlorate" 22 pages, revised (Jul. 22, 1998).

United States Environmental Protection Agency, Office of Ground Water and Drinking Water, "Perchlorate" 19 pages, revised (Feb. 1, 1999).

Zero Waste America Promotes the Elimination of Waste, Toxics, & Pollution, "Perchlorate" Mar. 17, 1999; Conference on Perchlorate in Ontario, California.

American Water Works Association Research Foundation, Final Report of the Perchlorate, Research Issue Group Workshop, Sep. 30–Oct. 2, 1997, Ontario, California.

Camesano, Teri A., "Influence of Fluid Velocity and Cell Concentration on the Transport of Motile and Nonmotile Bacteria in Porous Media", *Environ Sci. Technol*, (1998), 32:1699–1708.

Jewett, David G., "Bacterial Transport in Laboratory Columns and Filters: Influence of Ionic Strength and pH on Collision Efficiency", *Wat. Res.*, 29:7 (1995) 1673–1680.

Gayle, B.P., "Biological Dentrification of Water", *J. of Environ. Eng.*, 115:5 (Oct. 1989) 930–943.

Li, Qun, "Enhancing Bacterial Transport for Bioaugmentation of Aquifers Using Low Ionic Strength Solutions and Surfactants", *Wat. Res.*, 33:4 (1999) 1090–1100.

Wallace et al. CAPLUS Abstract No. 129:24308 of 'Perchlorate reduction by a mixed culture in an up–flow anaerobic fixed bed reactor.' J. Ind. Microbiol. Biotechnol. vol. 20, No. 2 (Feb.–1998), pp. 126–131.*

* cited by examiner

Primary Examiner—William H. Beisner
(74) Attorney, Agent, or Firm—Thomas J. Monahan

(57) ABSTRACT

A new method of treating water to remove perchlorate contaminant is disclosed. Water is fed through a filter bed containing perchlorate-reducing microorganisms. The microorganisms reduce the perchlorate, thereby decontaminating the water. An oxidizable substrate serves as an electron donor to the microorganisms. The invention results in safe to undetectable levels of perchlorate in the treated water.

32 Claims, 3 Drawing Sheets

METHOD AND APPARATUS FOR TREATING PERCHLORATE-CONTAMINATED DRINKING WATER

CROSS-REFERENCE TO RELATED APPLICATION

This application claims the benefit of U.S. Provisional Application Ser. No. 60/080,622, filed Apr. 3, 1998.

FIELD OF THE INVENTION

This invention relates to the treatment and purification of water. More specifically, the invention relates to the treatment of water or other aqueous solutions to remove perchlorate contaminant.

BACKGROUND OF THE INVENTION

Perchlorate is an anion ($ClO_4^-$) which occurs in small amounts in nitrate deposits in Chile, in Chilean saltpeter, and in fertilizers imported into the US that are made using these nitrate deposits. In large quantities it is produced as ammonium perchlorate, which is manufactured as an oxidizer component in solid propellant for rockets, missiles, and fireworks. Because of its shelf life, it must be periodically washed out of the missile and rocket inventory and replaced with a fresh supply. Thus, large volumes of the compound have been disposed of in Nevada, California, Utah, and likely other states, since the 1950's. Ammonium perchlorate is also used in certain munitions, fireworks, the manufacture of matches, and in analytical chemistry.

Perchlorate has been found in many surface waters, such as Lake Mead, and in ground waters at concentrations ranging from 5 ppb (the detection limit) to 0.37%. The majority of locations where perchlorate has been detected in the groundwater are in California based on the presence of twelve facilities which have manufactured or tested solid rocket fuels for the Department of Defense or the National Aeronautics and Space Administration (NASA). Perchlorate has been found in 30% of the wells sampled in California, and is above the state's provisional action level in 9% of those wells.

Two facilities which manufactured ammonium perchlorate in Nevada have been found to have released perchlorate to groundwater which is the source for low levels (4–16 ppb) in Lake Mead and the Colorado River. This water is used for drinking water supply, irrigation and recreation for millions of people in Nevada, California, Arizona, and Native American Tribes. Perchlorate has also been detected in many other states, including Arkansas, Indiana, Iowa, Louisiana, Maryland, New York, Pennsylvania, Texas, Utah, Virginia, and West Virginia. The EPA expects perchlorate to be found in virtually all of the lower 48 states except perhaps Maine, Vermont, Connecticut, and Rhode Island.

Perchlorate exists in the environment as an anion from the solid salts of ammonium, potassium, or sodium perchlorate. Perchlorate salts are extremely soluble and stable when dissolved in water and are therefore not easily removed from water using conventional technologies. The perchlorate anion ($ClO_4^-$) is exceedingly mobile in aqueous systems and can persist for many decades under typical groundwater and surface water conditions, due to kinetic barriers to its reactivity with other available constituents.

Until recently, potassium perchlorate had been used therapeutically to treat hyperthyroidism resulting from an autoimmune condition know as Graves' disease. Potassium perchlorate is still used diagnostically to test thyroid hormones (TSH, T3 and T4) production in some clinical settings. The basis for the effect on thyroid hormone function is the competitive inhibition of iodide anion uptake by perchlorate which results in reduced thyroid hormone production. Thyroid hormone deficiencies lead to decreased metabolism, growth, and development. Perchlorate is believed to disrupt the production of normal levels of thyroid hormone in mammals by inhibiting the uptake of iodide anion by the thyroid gland.

Due to its interference with iodine in the production of hormones in the human thyroid, the contamination of waters with perchlorate is potentially a national concern. Perchlorate has recently been measured in several surface waters and groundwaters in the United States at concentrations up to 3700 mg/L. The California Department of Health Services (CDHS) based on the work by the U.S. Environmental Protection Agency (EPA), has established a provisional action level of 18 $\mu$g/L for drinking water. The presence of perchlorate at these high concentrations in the aqueous environment, coupled with a very low drinking water standard, has created a national water contamination crisis in the United States potentially affecting 12 million people.

Typical water treatment technologies such as ion exchange, air stripping, carbon adsorption, and advanced oxidation are not currently cost efficient for the removal of perchlorate from drinking water. Perchlorate removal in membrane process, such as reverse osmosis, also has not yet been tested satisfactorily. In fact, a team of experts who recently met at a special workshop on perchlorate agreed that there is currently no proven removal process to treat perchlorate-contaminated water to drinking water standards. American Water Works Association Research Foundation (AWWARF). 1997. *Final Report of the Perchlorate Research Issue Group Workshop,* September 30 to October 2.

Despite the knowledge that perchlorate is biodegradable, no published reports on water treatment studies have demonstrated that perchlorate can be removed from contaminated waters to the levels required for drinking water while maintaining water quality sufficient to meet other drinking water primary and secondary standards.

Reactors have been used for purposes of wastewater treatment and drinking water treatment. To date, microbiological degradation of chlorate and perchlorate to low levels has been achieved only in engineered bioreactors suitable for wastewater treatment. The distinction between wastewater and water reactors is that for drinking water treatment, all toxic chemicals and most organic matter must be removed. For wastewater treatment, microbes and organic matter may remain in the water (subject to regulations) if it is to be discharged to a receiving water body or a publicly owned treatment works (POTW).

The development of biological reactors for water treatment requires new design strategies. No large-scale biological drinking water treatment systems currently exist in the United States. Thus, there is no established design basis for developing (per)chlorate drinking water treatment systems.

The present inventor has now discovered that perchlorate can be safely removed from drinking water sources through the use of an anaerobic biofilm packed bed system. In this system, perchlorate serves as an electron acceptor, and hydrogen gas or another oxidizable substrate serves as an electron donor. This unique system provides for the removal of perchlorate to below detectable levels.

It is therefore an objective of the present invention to provide a method and means of removing perchlorate from drinking water sources to safe and/or undetectable levels.

It is a further objective of the present invention to provide a method and means of removing perchlorate from drinking water sources wherein perchlorate is microbiologically reduced.

It is still a further objective of the present invention to provide a method and means of removing perchlorate from drinking water sources which limits subsequent biological growth in the water distribution system.

It is yet a further objective of the present invention to provide a method and means of removing perchlorate from drinking water sources which is economical.

These and other objectives will become apparent from the following description.

SUMMARY OF THE INVENTION

The present invention describes a novel system for removing perchlorate from drinking water sources. The invention involves the reduction of perchlorate by passing perchlorate-contaminated water through a filter bed inoculated with perchlorate-respiring microorganisms. Perchlorate is degraded by the microorganisms under anoxic conditions wherein perchlorate acts as an electron acceptor for respiration. An oxidizable substrate is also included in the bed to act as an electron donor for the microorganisms. The substrate maintains the concentration of microorganisms by serving as a food source. The method is effective in removing perchlorate to below detectable levels of less than 4 μg/L.

DETAILED DESCRIPTION OF THE PREFERRED EMBODIMENT

Figure 1:
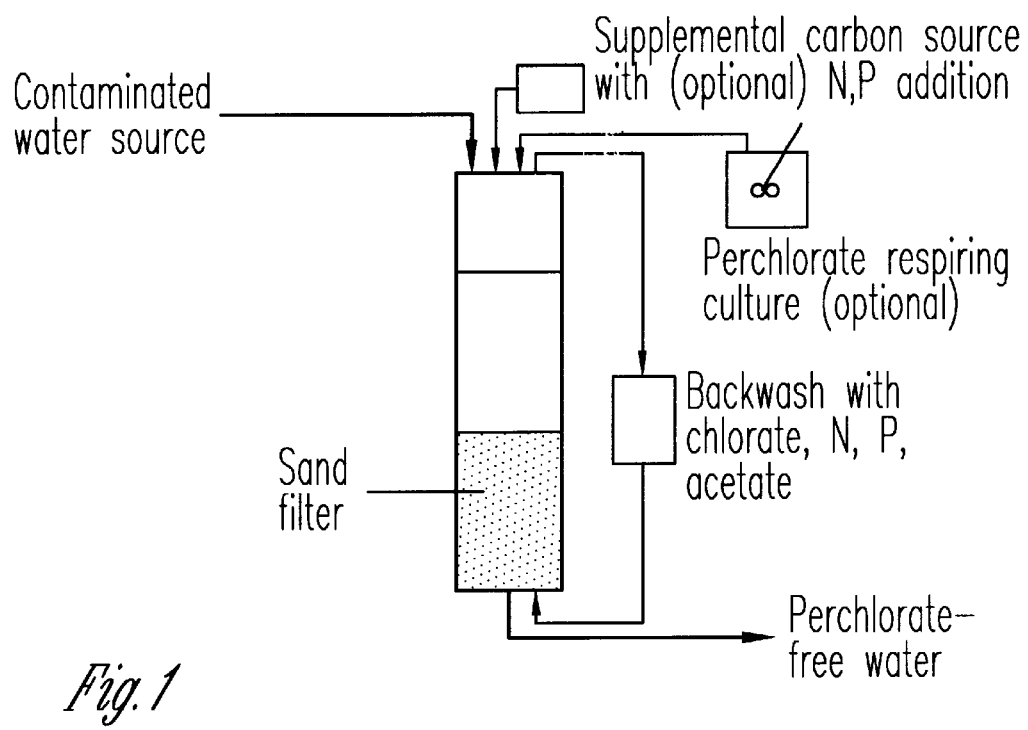
FIG. 1 is a diagram of a perchlorate fixed-bed reactor shown in accordance with the present invention.

Perchlorate is biodegradable under certain conditions. Several bacterial isolates have been shown to be capable of not just reducing perchlorate, but completely reducing perchlorate to chloride for cell respiration. Differing reports on cell size, morphology, and chemicals that serve as reductants make it apparent that the ability to reduce perchlorate is not limited to a single bacterial species. The biochemical similarity of strains capable of respiring both chlorate and perchlorate suggests that data obtained from perchlorate cultures is applicable to chlorate cultures. Microbes known to respire either chlorate or perchlorate include *Vibrio dechloraticans* Cuznesove B-1168, *Acinetobacter thermotoleranticus, Ideonella dechloratans,* GR-1, a strain identified to belong to the β subgroup of Proteobacteria, and *Wolinella succinogenes* HAP-1.

Little is known about the biochemical pathways involved in bacterial utilization of chlorate or perchlorate as an electron acceptor. The conversion of chlorine in perchlorate to chloride requires the overall transfer of eight electrons. Chlorite dismutase, a novel enzyme isolated from strain GR-1, was found to be capable of converting chlorite ($ClO_2^-$) to oxygen and chloride. van Ginkel, et al. 1995. "Reduction of chlorate with various energy substrates and inocula under anaerobic conditions." *Chemosphere* 31:4057–4066. Recently, van Ginkel et al. reported that they isolated a (per)chlorate reductase capable of reducing both perchlorate and chlorate. van Ginkel, et al. 1998. "Microbial conversion of perchlorate, chlorate and chlorite." In: Proceedings of the Southwest Focused Groundwater Conference: *Discussing the Issue of MTBE and Perchlorate in the Ground Water,* pp. 92–95. National Ground Water Association. This establishes for strain GR-1 a sequence of intermediates involved in perchlorate reduction of:

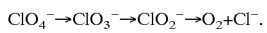

$$ClO_4^- \rightarrow ClO_3^- \rightarrow ClO_2^- \rightarrow O_2 + Cl^-.$$

Oxygen did not accumulate in cell suspension solutions fed perchlorate or chlorate and therefore oxygen is used as an electron acceptor, but oxygen can accumulate in cultures amended with elevated concentrations of chlorite. van Ginkel et al., 1996.

As set forth above, the present invention for the first time discloses a method of removing perchlorate from large volumes of water through the use of perchlorate-respiring microorganisms (PRMs) in an anaerobic biofilm filtering system. Through the respiration of the microorganisms, perchlorate is removed to the ppb range or lower.

Any perchlorate contaminated water may be treated according to the methods of the present invention. This includes, but is not limited to, perchlorate-contaminated groundwater, which has either been pumped above ground, or remains in situ in its natural aquifer, perchlorate present in pumped or collected leachate, or perchlorate-contaminated waste water from an industrial source.

Biofilm reactors have been used successfully since 1983 in the treatment of drinking water. These reactors have primarily been utilized in the removal of nitrate contaminants. The reduction reactions of nitrate and chlorate are energetically favored. Nitrate reduction, however, results in the formation of nitrite intermediates which can accumulate in the water. In contrast, reduction of perchlorate and chlorate has surprisingly been found to not result in the accumulation of toxic intermediates such as chlorite.

The invention utilizes perchlorate-respiring microorganisms (PRMs). A perchlorate-respiring microorganism is any microorganism that consumes perchlorate in respiration. It has thus-far been found that these same microorganisms are also capable of respiring chlorate. The following is a non-limiting list of species of bacteria have been identified as PRMs:

Vibrio dechloraticans Cuznesove B-1168;

*Wolinella succinogenes;*

GR-1, a strain identified to belong to the β subgroup of Proteobacteria

These bacteria species may be used alone in the reduction of perchlorate, or in combination. It is likely that other microorganisms will be found that are also capable of respiring perchlorate. These microbes are also intended to be included within the scope of the present invention. The above-listed microbes are found abundantly in nature in creek water and especially in waste water.

In one embodiment of this invention, perchlorate-contaminated water may be processed in an aquifer. The term "aquifer" as used herein describes any in-ground geological formation containing water, including sand, gravel, broken rock, and the like, which is permeable to groundwater. Natural groundwater hydraulic gradients exist in the aquifer, whereby the groundwater naturally moves through the aquifer at a particular velocity in a particular direction. In this embodiment, water flows or is pumped through a fixed bed containing a mass of filling agents, such as sand, with sufficient quantities and/or concentrations of any of the above-listed PRMs and oxidizable substrate. Potentially limiting factors for perchlorate reduction in this embodiment include an absence of sufficient quantities of oxidizable substrate, competition for substrates by other microorganisms, and limiting nutrients such as nitrogen and phosphorus.

The process of reductive degradation in an aquifer is generally described in U.S. Pat. No. 3,640,821 to Sweeney and U.S. Pat. No. 5,266,213 to Gillham, the disclosures of which are hereby incorporated by reference. Gillham describes reductive degradation using zero valent iron as applied to TCE contaminated waters, while Sweeney describes reductive degradation of halogenated pesticides using the same substrate. These references, however, do not disclose the methods for removing perchlorate from contaminated water as practiced in the present invention.

In a preferred embodiment, water is treated above ground by any means in which perchlorate-contaminated water is passed through a filtering bed containing at least one of the aforementioned PRMs. The bed may be configured in a variety of ways, including a packed column, fixed-bed filter, and other configurations that are well known in the art. The filtering bed is most preferably included in a reactor.

Figure 2:
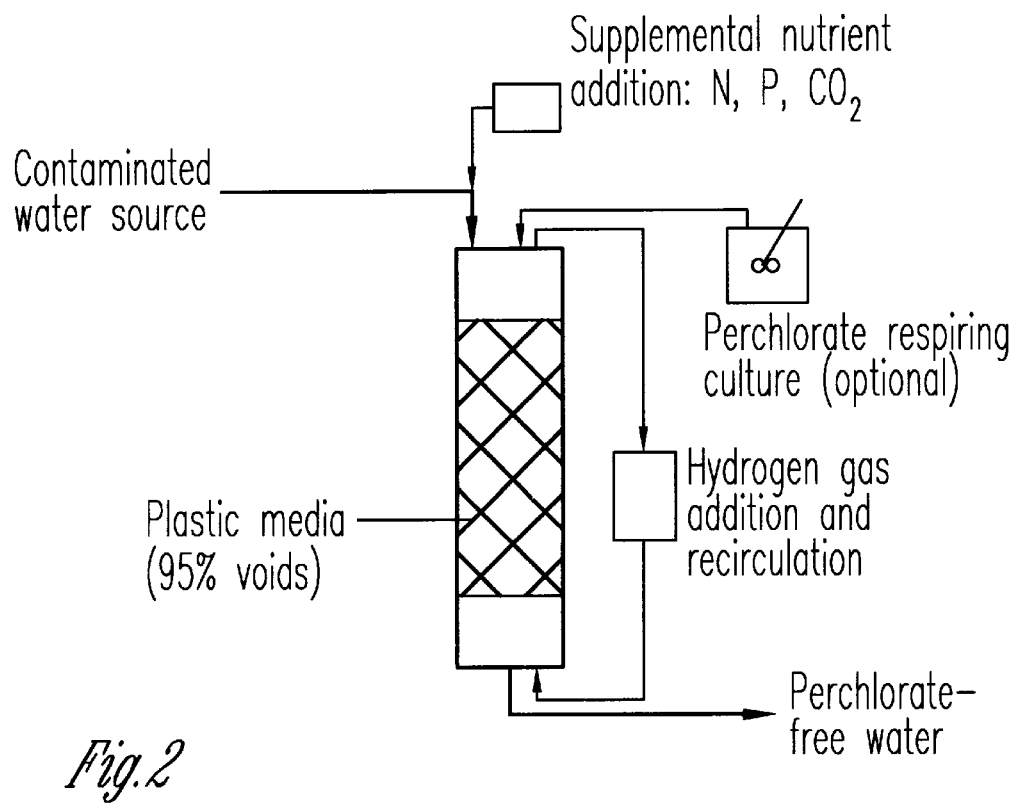
FIG. 2 is a diagram of a gas-fed perchlorate bioreactor shown in accordance with the present invention.

FIGS. 1–2 are diagrams of three types of bed configurations that may be used in the present invention. FIG. 1 illustrates a perchlorate fixed-bed reactor, FIG. 2 illustrates a gas-fed perchlorate bioreactor. The fixed-bed reactor has the attributes of providing continuous perchlorate removal while avoiding clogging by intermittent backwashing. The fixed-bed reactor further provides biofilm regeneration.

With respect to the gas-fed perchlorate bioreactor (FIG. 2), it also provides continuous perchlorate removal, avoidance of clogging by unsaturated media (trickling filter/air stripper), and biofilm fueled by $H_2$ gas phase.

The filter bed as used in a reactor system preferably includes a column that is packed with a support media, such as sand, stones, soil, plastic, activated carbon, or combinations thereof. Other appropriate support media are readily ascertainable by one skilled in the art. The column may be made of glass, plastic, silicone, or other non-reactive material. The column may range in length from about 10 cm–3 m. The support media is optionally placed in the column using the tap and fill method. Snyder, L. R. et al. (1979) "Introduction to Modern Liquid Chromatography." Wiley, New York. The support media is sufficiently packed in the column to allow contaminated water to filter through, yet retain the water in the column for a length of time sufficient for the PRMs to react and reduce the perchlorate. This length of time is generally about 10–60 minutes, with a minimum necessary retention time of about 10 minutes. The column preferably has filters placed at its entry and exit sites to assist in controlling the flow rate of the water into the column.

The support media is inoculated with microbial cultures that include PRMs. The bacteria should generally be present on the supporting media as a biofilm 0.001–1 mm thick. Bacteria are prepared for inoculation by first transferring the cells to a sterile, phosphate-buffered solution, such as potassium phosphate, to provide a final microbial stock solution of from about $10^6$–$10^{10}$ cells $ml^{-1}$. The stock solution is then passed through the column at an interstitial velocity of approximately 1 to 10 m/d, similar to groundwater velocities in clean sand. Freeze R. A., et al. (1979) "Groundwater". Prentice-Hall, Englewood Cliffs, N.J.

The degree of bacterial penetration into the column can be adjusted by varying the ionic strength of the carrying solution. Specifically, higher cell penetration is achieved by using a carrying solution of lower ionic strength. The pH of the solution has little effect upon bacterial penetration, and should generally be kept in the range of 5.0–8.0. The temperature of the column should be kept in the range of from about 10 to about 30° C. to keep cells viable and active.

The perchlorate-removal system further includes an oxidizable substrate which serves as an electron donor. The substrate provides electrons to the PRMs in the media. Oxidizable substrates include acetate, ethanol, methanol, and hydrogen gas. Of these, hydrogen gas is preferred. Hydrogen gas is sparingly soluble, and therefore does not persist in water at appreciable concentrations. A side benefit of using hydrogen gas as the substrate may also be that hydrogen has been shown to support biological dehalogenation of several chlorinated aliphatic compounds, including tetrachloroethylene, TCE, and vinyl chloride. Ballapragada, B. S. et al. 1997. "Effect of hydrogen reductive dechlorination of chlorinated ethenes." *Environ. Sci. Technol.* 31(6):1728–1734. Acetate is a well proven substrate for use in the invention, but its use may not be cost-effective in larger systems.

The hydrogen gas may be from a containerized source or created on site electrolytically or by other means. Due to cell maintenance and energy requirements, there is a minimum achievable substrate concentration that is a function of the reactor configuration and microbial kinetic constants. For example, the minimum substrate concentration achievable in a completely mixed, constant-flow, suspended-growth bioreactor is $S_{min}=b\ K_s/(\mu m-b)$. Rittmann, B. E. et al. 1980. "Model of steady-state biofilm kinetics." *Biotechnol. Bioengin.* 22:2342–2457. The values of these constants must be known to calculate the minimum substrate concentration. Generally, the concentration of hydrogen gas or other oxidizable substrate in the reactor should be maintained at an amount sufficient to avoid potential for explosions when hydrogen has mixes with oxygen (usually not more than 10%). Generally the substrate should be present at least in an amount slightly in excess of that required to maintain the energy requirements of the PRMs in the media.

Supplemental nutrients may also be optionally provided to the PRMs in the filtering bed system. Such nutrients include nitrogen, phophorus, and carbon dioxide, and various other carbon sources, such as phenol in standard amounts ascertainable by those of skill in the art.

The reactor is run either as a four-phase system (gas, water, bacteria, and solid support) where bacterial growth is supported through the oxidation of hydrogen gas provided in an oxygen-free atmosphere, or as a three-phase system (water, bacteria, and solid support) where bacteria are grown on solid substrates in water. In the four-phase (saturated) system, hydrogen gas is added into the reactor gas phase, while oxygen is excluded. In contrast, in the three-phase (unsaturated) system, the oxidizable substrate is added directly to the contaminated water prior to the water entering the reactor.

Figure 3:
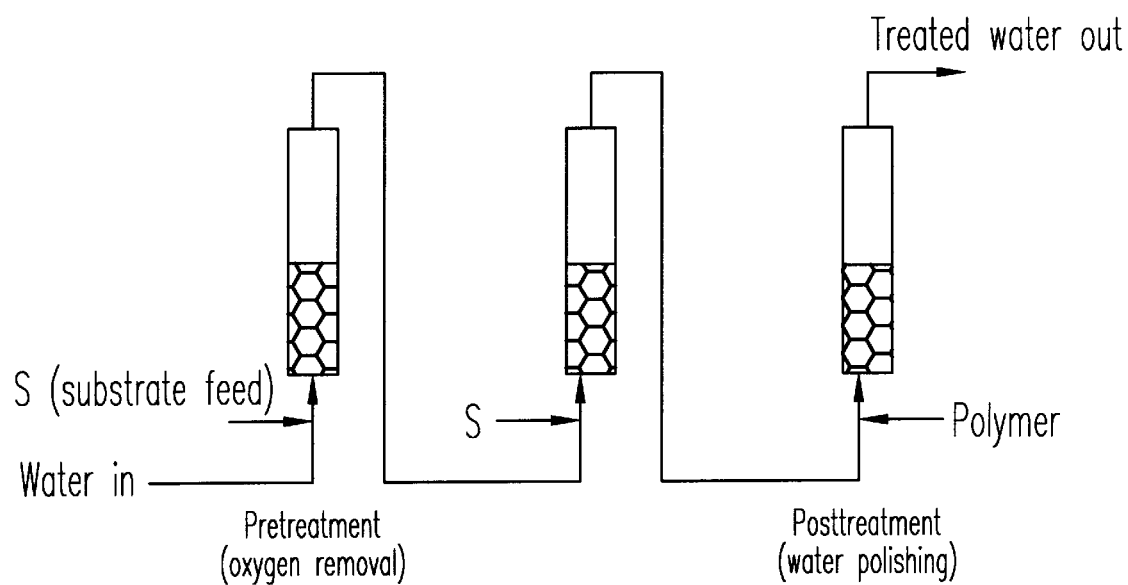
FIG. 3 is a diagram of a packed bed treatment train shown in accordance with the present invention.

FIG. 3 illustrates a packed bed treatment train as an example of a three-phase (saturated) system. This system includes three different sections: 1) a pretreatment section for oxygen removal; 2) an anaerobic perchlorate biofilm reactor section; and 3) a posttreatment section for water polishing. The pretreatment and posttreatment trains may not be needed in all cases. The pretreatment functions to consume all oxygen for the anaerobic perchlorate biofilm reactor, while posttreatment is provided to remove any sloughed biofilm and to provide for biological polishing of any remaining growth substrate (S) in the water sample.

Figure 4:
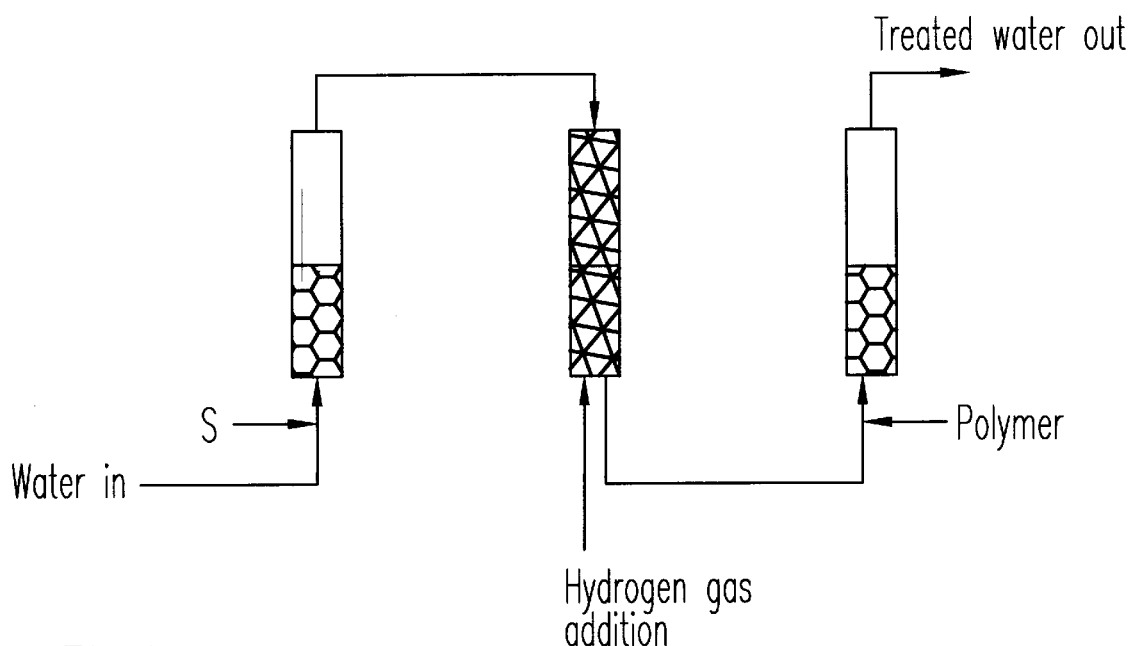
FIG. 4 is a diagram of an unsaturated (trickle-bed) packed bed treatment train shown in accordance with the present invention.

FIG. 4 illustrates an unsaturated (trickle-bed) packed bed treatment train as an example of a four-phase system. In this diagram, hydrogen is used as the electron donor.

As shown in FIGS. 3–4, The reactor may consist of several sections or trains (i.e. several reactors in a series) that are optimized depending on the strategy, but linked in order to optimize perchlorate removal. For example, the first reactor may be designed to remove oxygen from the water prior to perchlorate removal since anoxic conditions are necessary to promote reduction. Further, a reactor may be added following the perchlorate biofilm reactor to remove any remaining electron acceptor in a posttreatment process, for example, an anaerobic reactor where carbon dioxide serves as an electron acceptor or a separate aerobic reactor where oxygen can be used as an electron acceptor.

In practice, water suspected of being contaminated with perchlorate is fed into the bed or entrance of the reactor. At this time, water may be pretreated to remove oxygen as shown in FIG. 3, or fed directly into the reactor under anoxic conditions. Further, as provided above, if the saturated mode is used as in FIG. 3, the oxidizable substrate is added directly to the water prior to the water entering the reactor.

Figure 5:
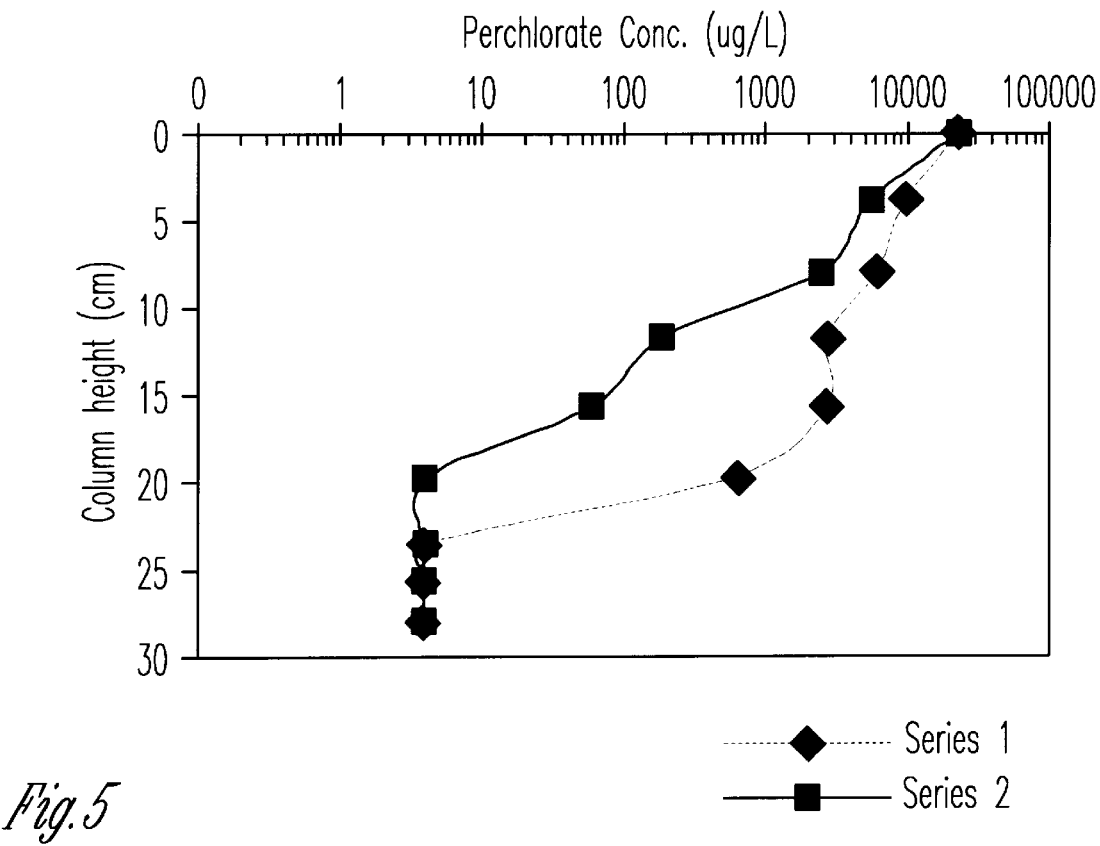
FIG. 5 is a graph illustrating the rate of perchlorate reduction in a sand column as a function of the height of the column used.

The water should be fed at a rate slow enough to allow time for the PRMs to reduce the perchlorate, thereby decontaminating the water. The inventor has determined that a loading rate of <0.11 gpm/ft$^2$ is necessary to remove perchlorate to drinking water standards using a bed length of 14.2 cm. However, conventional drinking water sand filters, which operate at higher hydraulic loading rates (in the range of 2–5 gpm/ft$^2$) may be suitable for treatment due to their longer lengths. Scaling the results based only on a detention time of about 10 minutes, would require a typical water treatment filter loaded at 0.6 gpm/ft$^2$ for a filter 6-ft in length. FIG. 5 illustrates the rate of perchlorate reduction in a sand column based upon the height of the column used.

As water flows down through the reactor, the PRMs growing on the column packing use the hydrogen gas or other oxidizable substrate as a food source (electron donor) and use the perchlorate as an electron acceptor to accomplish perchlorate removal.

As previously described above, once the water exits the perchlorate removal reactor, it may then proceed to a perchlorate biofilm reactor to remove any remaining electron acceptor in a post treatment process. In addition, the biofilm in the anaerobic can be regenerated by temporarily halting the flow of contaminated water through the reactor, and thereafter recycling water containing relatively high concentrations of electron donor and electron acceptor (such as chlorate at mg/L levels) so that bacteria may grow and form a thick biofilm. The reactor can then be placed back in service by rinsing with clean water. Contaminated water can then be held for subsequent treatment or treated in the reactor through continuous recycle.

The reactor may also be designed for backwashing in order to redistribute bacteria that preferentially will grow near the column effluent to the whole column, and in order to dislodge old biofilm or other material that may accumulate on the media packing. FIG. 1 illustrates an example of a backwashing process.

Using the above-described procedure and apparatus, perchlorate may be removed from water to levels which meet drinking water standards, and may further be removed to non-detectable levels of <4 ppb.

The following examples are presented for informational purposes only. They are not intended to limit the scope of the invention in any manner.

EXAMPLE 1

Removal of Perchlorate Using a Soil-Packed Column

Methods

Glass columns (Chromaflex; 2.54 cm diameter, 14.2 cm long) were packed with a sandy soil from Tucson, Ariz. This soil was collected 3 to 6 feet below the surface from the North Fallow Field at the University of Arizona farm. The soil had an average particle diameter of 127 $\mu$m, a uniformity coefficient of 2.45, and was composed of 90% sand, 7% silt, 3% clay, and had an organic carbon content of 0.07%. Columns were packed dry using a tap and fill procedure, and had all Teflon fittings and 500 $\mu$m pore size mesh at the column entry and exit. Water was fed into the column using a positive displacement pump at rates between 1.18 to 3.05 ml/min. All tubing was made of silicon.

A mixed microbial consortium capable of degrading perchlorate was developed by adding perchlorate (1 g/L) to a 1% wastewater sample obtained from the primary digester at the States College Wastewater Treatment Plant. This suspension was incubated in several crimp-top serum bottles (120 ml, with headspace purged with $N_2$ gas) at room temperatures for 7 days, then transferred (10%) into water containing 1 g/L of acetate and 1 g/L of perchlorate. The ability of this consortium to degrade perchlorate was evidenced by 39% removal of perchlorate within 4 days. The column reactors were then inoculated with this acclimated consortium, and left for 1-day prior to pumping. Columns were then operated for several days to develop a biofilm containing perchlorate degrading microorganisms.

An artificial groundwater (AGW) based on the composition of granitic rock aquifer was used in column studies. The water consisted per liter of deionized water, of: 6.5 mg of $MgSO_4$, 4.3 mg $CaSO_4 2H_2O$, 5.85 mg of NaCl, and 48.0 mg of $CaCO_3$. To this AGW, the following was added in column biodegradation studies: 100 mg/L acetate, 20 mg/L perchlorate, and nitrogen and phosphorus at a ratio of 100:23:4.3 as C:N:P. All samples were immediately filtered through 0.2 mm polycarbonate filters (Poretics Corp.) to remove bacteria prior to chemical analysis.

Perchlorate and acetate were measured using a Dionex 100 ion chromatograph equipped with an autosampler and an AS-11 (Dionex) column. Perchlorate was analyzed using a 100 mM NaOH eluent. External water mode was required using a suppressor (ASRS-I). Sample loops of 25 $\mu$L and 1000 $\mu$L were used to measure concentrations of perchlorate down to a detection limit of 4 $\mu$g/L. Acetate was measured using the same setup, but with a 0.5 mM $NaHCO_3$ and 1.5 mM $Na_2CO_3$. For each set of measurements, a three point calibration curve was used.

Results and Discussion

Figure 6:
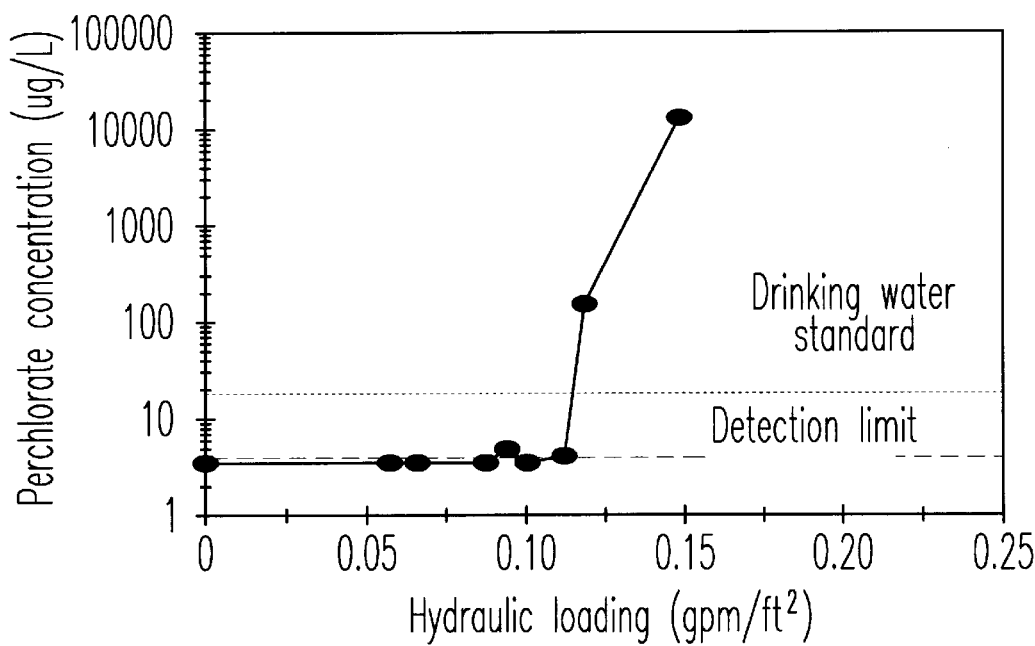
FIG. 6 is a graph illustrating the perchlorate concentrations in column effluent as a function of hydraulic loading rate. Columns were fed an artificial groundwater amended with acetate, nutrients, and an average 20 mg/L of perchlorate.

At hydraulic loadings of 0.06 to 0.11 gpm/ft$^2$, perchlorate was removed to below the California drinking water standard of 18 $\mu$g/L, and to below detectable levels (4 $\mu$g/L) except at 0.09 gpm/ft$^2$ where the perchlorate concentration of 4.8 $\mu$g/L was just above the detection limit. (See FIG. 6). These removals translate to >99.98% based on the influent concentration of 20 mg/L of perchlorate. At the two higher loadings tested, breakthrough was observed in the column at 152 μg/L at 0.12 gpm/ft². When the loading was 0.15 gpm/ft², breakthrough was observed at a concentration of 12.7 mg/L. Acetate was fed to this reactor at high concentrations (100 mg/L), and acetate remained in excess concentration in the reactor effluent. Acetate concentrations at steady state operation at hydraulic loadings of 0.085 and 0.11 gpm/ft² were 59 and 84 mg/L, respectively.

These experiments demonstrate that perchlorate is removed from water by developing a perchlorate-respiring consortium of microorganisms as a biofilm on sand in a packed bed reactor. Although low loading rates (<0.11 gm/ft²) were necessary here to remove perchlorate to drinking water standards, the bed length used in the experiments was only 14.2 cm long. As set forth above, however, conventional drinking water sand filters, which operate at higher hydraulic loading rates (in the range of 2–5 gpm/ft²), may be suitable for treatment because of their longer lengths.

EXAMPLE 2

Removal of Perchlorate in a Bench-Scale Fixed Bed Reactor

Materials and Methods

A bench-scale fixed bed reactor (244 cm high by 7.6 cm diameter) constructed from acrylic tubing was filled to 96 cm with activated carbon (Carbon 1240, Norit, OK). The reactor was inoculated with a perchlorate-acclimated culture, suspended in acetate and trace-mineral medium (van Ginkel et al., 1995) developed from primary digester sludge obtained from a local wastewater treatment plant. After one day, the column was operated in upflow mode and continuously fed the AGW and media at a hydraulic loading rate of 0.11 gmp/ft². AGW consisted of tapwater (groundwater source) aerated to remove chlorine, and nutrients (nitrogen and phosphorus). Media was made up in concentrated (100x) and diluted to final concentrations of ~35 mg/L of perchlorate and either 30 or 60 mg/L of acetate. Concentrations of perchlorate and acetate were measured using either a Dionex 100 or 500 Ion Chromatograph using an AS-11 column. For perchlorate measurements, procedures in Dionex Application Note 121 were followed.

A hydrogen-oxidizing, perchlorate reducing culture was developed in 125 mL crimp-sealed serum bottles inoculated with activated sludge from a local wastewater treatment plant. The medium consisted of the following constituents: 300 mg/L $NaClO_4^-$; 1550 mg/L $K_2HPO_4$; 850 mg/L $NaH_2PO_4$; 500 mg/L $NH_4H_2PO_4$; 3000 mg/L $Na_2CO_3$; and a trace mineral solution. Following inoculation of the bottles, headspace volumes were purged with 5% $H_2$/95% $N_2$ gas. After acclimation, evidenced by perchlorate reduction, the contents of a bottle were transferred into a sterile reactor (Applicon, Inc.) and fed a mixture of hydrogen and carbon dioxide gases. After 12 days, the reactor was operated at a detention time of 16.7 hr.

Results and Discussion

Fixed Bed Reactor:

Within just four days of operation, perchlorate was removed to below detectable limits (<4 μg/L) in the activated carbon packed bed reactor. Other results using smaller and shorter columns indicated that this level of performance of the reactor could be maintained for weeks but that eventually the column would begin to clog due to the accumulation of biomass. Therefore, it was desired to examine the effect backwashing would have on the performance of the column. The column was mixed (fluidized) on day 6 using tap water, the media was allowed to settle, then the column operation was reinitiated.

After column mixing, the column performance deteriorated, eventually resulting in no perchlorate removal by day 12. With continued operation, perchlorate levels again began to drop but did not do so within four days as originally observed. Intracolumn testing on day 15 revealed that perchlorate was being reduced to 5 mg/L within a short distance in the column (12 cm), but that perchlorate concentrations actually increased at subsequent sampling locations. The increase in perchlorate concentrations suggested that perchlorate was desorbing from the column and that biological activity was insufficient to remove the perchlorate. Thus, perchlorate was desorbing at a rate faster than it could be used by the bacteria.

By sampling the effluent for acetate, it was realized that acetate was no longer present in excess, and on day 24 the concentration of acetate was doubled in the feed. Within a few days perchlorate concentrations were reduced to almost 10 μg/L, or to below the 18 μg/L interim State of California drinking water standard.

Hydrogen-oxidizing Reactor:

Perchlorate reduction was found to be accomplished under anoxic and hydrogen oxidizing conditions. After about 7 days of operations, the suspended-growth reactor operated in chemostat mode reduced perchlorate by 240 mg/L, resulting in effluent perchlorate concentrations of 3 to 8 mg/L. Although these treatment levels would not be acceptable for drinking water treatment, it was demonstrated that it was possible to achieve perchlorate reduction under hydrogen oxidizing conditions by perchlorate-acclimated cultures.

As shown above, the present invention describes a novel method of means of removing perchlorate from water to levels that are safe for consumption and, in some instances, below the level of detection. It is therefore submitted that the present invention accomplishes at least all of its stated objectives.

What is claimed is:

1. A method of reducing the concentration of perchlorate in a drinking water source comprising:
   treating water contaminated with perchlorate with a perchlorate-respiring microorganism for a length of time sufficient to reduce any perchlorate contained in the water to a level of <18 μg/L, and thereafter;
   separating said water from said microorganism.

2. A method according to claim 1 wherein the water is treated in a single reactor under anaerobic conditions.

3. A method according to claim 1 further including the step of providing the microorganism with an oxidizable substrate.

4. A method according to claim 3 wherein the oxidizable substrate is added to the water prior to the water being exposed to the microorganism.

5. A method according to claim 3 further including the step of:
   removing the microorganisms and the oxidizable substrate from the water following the treating step.

6. A method according to claim 1 wherein the water is exposed to the microorganism by feeding it through a filtering bed containing the microorganism.

7. A method according to claim 6 further including the step of:
   redistributing the microorganisms in the filtering bed to prevent the microorganisms from preferentially growing in particular areas of the filtering bed.

8. The method of claim 6 further comprising backwashing or air-sparging the bed periodically to remove old microorganisms.

9. The method of claim 1 further including the step of:
removing oxygen from the water prior to the treating step.

10. A method according to claim 1 wherein perchlorate is removed from the water to a level of less than 4 µg/L.

11. A method according to claim 10 wherein the perchlorate is removed from the water to a level that is undetectable.

12. The method of claim 1 wherein the residence time is about 10 to about 60 minutes.

13. The method of claim 1 wherein the pH is about 5.0 to about 8.0.

14. The method of claim 1 wherein the temperature is about 10° C. to about 30° C.

15. The method of claim 1 wherein the biofilm thickness is about 0.001 to about 1 mm.

16. The method of claim 1 further comprising regenerating the microorganisms by periodically exposing the microorganisms to high concentrations of chlorate or perchlorate.

17. The method of claim 16 wherein the regeneration is accomplished while the treatment of drinking water is suspended.

18. The method of claim 1 further comprising re-inoculating with new microorganisms periodically.

19. A method of reducing perchlorate contamination in water from a drinking water source comprising:

a) passing perchlorate-contaminated water through a fixed bed reactor under anaerobic conditions while maintaining a pH of about 5.0 to about 8.0 and a temperature of about 10° C. to about 30° C. wherein the fixed bed is seeded with perchlorate-respiring microorganisms capable of growth on a single oxidizable substrate which are maintained as a biofilm of about 0.001 mm to about 1 mm on the fixed bed and the residence time is about 10 minutes to about 60 minutes; and b) providing an oxidizable substrate to the perchlorate-respiring microorganisms wherein the oxidizable substrate is selected from the group consisting of hydrogen gas, acetate, ethanol and methanol and any additional nutrient requirements of the microorganisms wherein the method reduces the perchlorate to a level of <18 µg/L.

20. A system for removing perchlorate from drinking water comprising:

a filtering means; and at least one strain of a perchlorate-respiring microorganism capable of growth on a single oxidizable substrate inoculated on said filtering means wherein the system is capable of reducing perchlorate levels to <18 µg/L.

21. A system according to claim 20 further including an oxidizable substrate.

22. A system according to claim 21 wherein the oxidizable substrate is selected from the group consisting of hydrogen gas, ethanol, methanol, and acetate.

23. A system according to claim 22 wherein the oxidizable substrate is hydrogen gas.

24. A system according to claim 21 wherein the oxidizable substrate is proximal to the microorganisms such that the substrate becomes oxidized by the microorganism.

25. A system according to claim 20 wherein the perchlorate-respiring microorganism is selected from the group consisting of *V. dechloraticans* Cuznesove B-1168, GR-1, *W. succinogenes* HAP-1, or additional strains of the microorganisms from the group, or other microorganisms that are capable of respiring perchlorate.

26. A system according to claim 20 wherein the filtering means comprises filling agents selected from the group consisting of sand, soil, gravel, stones, plastic, activated carbon, or other inert supporting materials of large surface area and small size.

27. A system according to claim 26 wherein the filtering means further includes a column in which the filling agents are contained.

28. A system according to claim 27 wherein the column is from about 10 cm–3 m in length.

29. A system according to claim 27 wherein the column is made of a substance selected from the group consisting of glass, plastic, silicone, metal or concrete.

30. A system according to claim 27 wherein the filling agents are contained in a reactor or an aquifer.

31. A system according to claim 30 wherein the filling agents are contained in a reactor selected from the group consisting of a fixed-bed reactor, or a gas-fed bioreactor.

32. The system of claim 31 wherein the reactor is a gas-fed reactor and the reactor is operated in an unsaturated condition.

* * * * *